United States Patent [19]
Woo et al.

[11] Patent Number: 6,067,140
[45] Date of Patent: May 23, 2000

[54] LIQUID CRYSTAL DISPLAY DEVICE AND METHOD OF MANUFACTURING SAME

[75] Inventors: Joung Won Woo; Jae Beom Choi, both of Seoul, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/969,470

[22] Filed: Nov. 13, 1997

[30] Foreign Application Priority Data

Mar. 3, 1997 [KR] Rep. of Korea ............... 97-6882
Jun. 20, 1997 [KR] Rep. of Korea ............... 97-26085

[51] Int. Cl.⁷ ............... C02F 1/1337; C02F 1/1333; C02F 1/1343
[52] U.S. Cl. ............... 349/129; 349/110; 349/139
[58] Field of Search ............... 349/129, 110, 349/144, 139, 125

[56] References Cited

U.S. PATENT DOCUMENTS

| | | |
|---|---|---|
| 5,151,807 | 9/1992 | Katayama et al. ............... 349/144 |
| 5,598,285 | 1/1997 | Kondo et al. ............... 349/136 |
| 5,648,828 | 7/1997 | Sakamoto et al. ............... 349/132 |
| 5,666,178 | 9/1997 | Hirata et al. ............... 349/136 |
| 5,748,276 | 5/1998 | Uno et al. ............... 349/144 |
| 5,777,700 | 7/1998 | Kaneko et al. ............... 349/144 |

FOREIGN PATENT DOCUMENTS

| | | | |
|---|---|---|---|
| 5-281545 | 10/1993 | Japan | ............... 349/129 |
| 6-110060 | 4/1994 | Japan | ............... 349/144 |
| 7-159787 | 6/1995 | Japan . | |

*Primary Examiner*—William L. Sikes
*Assistant Examiner*—Dung Nguyen
*Attorney, Agent, or Firm*—Finnegan, Henderson, Farabow, Garrett & Dunner, L.L.P.

[57] ABSTRACT

A liquid crystal display device having a plurality of pixels, each pixel having a plurality of domains. In boundary regions between the domains, an opaque metal layer is formed to shield light transmission through these boundary regions and also to stabilize potential applied to pixel electrodes. A polyimide or photo-sensitive alignment layer is rubbed by fabric or exposed to light to provide alignment directions.

32 Claims, 4 Drawing Sheets

LIQUID CRYSTAL DISPLAY DEVICE AND METHOD OF MANUFACTURING SAME

BACKGROUND OF THE INVENTION

A. Field of the Invention

The present invention relates to a liquid crystal display device, and more particularly to a good image quality and wide viewing angle liquid crystal display device.

B. Description of the Prior Art

Conventional twisted nematic liquid crystal display devices (TN LCD) have a contrast angular dependence problem, i.e., the transmittance in each gray level depends on the viewing angle. In particular, this contrast angular dependence is very strong in the up and down directions. The angular dependence is caused by the phase difference according to the viewing angle which generates the birefrigence of the liquid crystal molecule.

To solve this angular dependence problem, a multi-domain LCD such as a two-domain TN LCD (TDTN LCD) and a domain divided TN LCD (DDTN LCD) have been introduced. In the TDTN LCD, each pixel has two director configuration domains, where the two pretilted directions are in opposing directions. Applying a gray level voltage to this LCD, the LC directors in the two domains are listed in opposite directions. These configurations average me up and down direction transmittance. In the DDTN LCD, materials having different pretilt angles, such as organic or inorganic materials, are alternately exposed in the each pixel. By the aligning process, each exposed area, i.e., each domain has a pretilt angle different from that of the neighboring domain.

FIG. 1A is a plan view of a conventional multi-domain LCD and FIG. 1B is a sectional view taken on line A-A' of FIG. 1A. As shown in these figures, a plurality of gate bus line 7 and data bus lines 9 cross each other, thereby defining the pixel region. At the cross of the gate bus lines 7 and the data bus lines 9, a plurality of thin film transistors of which gate electrodes 5 and source/drain electrodes 3 are respectively connected to the gate bus lines 7 and the data bus lines 9, are formed. A part of the gate bus lines 7 is used as an electrode for the storage capacitor. In this type, the metal layers 13 are formed on the gate bus lines 7 to stabilize voltage to the liquid crystal cell. In each pixel region, first and second alignment layers 17 and 18 are coated and then aligning-processed to divide the 4-domains having different alignment directions, as shown in FIG. 1B.

In a pixel having a plurality of domains, since the LC directors in neighboring domains are directed in the opposite or different directions, there are discrete planes of the alignment in the boundary region between the neighboring domains, as shown in FIG. 1B. Thus, when transmitting light through liquid crystal layer 25, the light leaks through the boundary region (line X-X' of FIG. 1B) between the domains. As a result, the disclination is generated in these regions.

To prevent the leakage of the light, black matrix 11 must be formed in the boundary region to shield the light entering this region, as shown in FIGS. 1A and 1B, but this black matrix 11 causes an aperture ratio problem. In addition, since the metal layer 13 for the storage capacitor covers gate bus lines 7 as well as a part of the pixel region, the aperture ratio characteristic is further deteriorated.

SUMMARY OF THE INVENTION

An object of the present invention is to provide a liquid crystal display device having an opaque metal layer for shielding the light entering the boundary region between the domains in each pixel to improve the image quality.

Another object of the present invention is to provide the liquid crystal display device in which the opaque metal layer in the boundary region is used for a storage capacitor to improve the perture ratio characteristics.

In order to achieve this object, according to the present invention, a liquid crystal display device, as embodied and broadly defined herein, has a plurality of pixels, in which each pixel has a plurality of domains and each domain has an alignment direction different from that of at least one of neighboring domains. The device further includes first and second substrate; an opaque metal layer between each domain and at least one neighboring domain; and a liquid crystal layer between the first and second substrates. The opaque metal layer shields the transmission of the light through the boundary region and stabilizes the data voltage applied to the pixel.

According to another aspect of the invention, a method of making a liquid crystal display device, which has a plurality of gate bus lines, a plurality of data bus lines crossing gate bus lines, a plurality of switching elements at the cross of the gate bus lines and the data bus lines, and a plurality of pixels, comprises forming a plurality of domains for each pixel in which each domain has an alignment direction different from that of at least one of neighboring domains, forming an opaque metal layer between each domain and at least one neighboring domain to block light transmission therethrough.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

It is a feature of the present invention that the opaque metal layer in the boundary region between the domains of the pixel is used for a shielding layer and a storage capacitor.

Figure 1A:
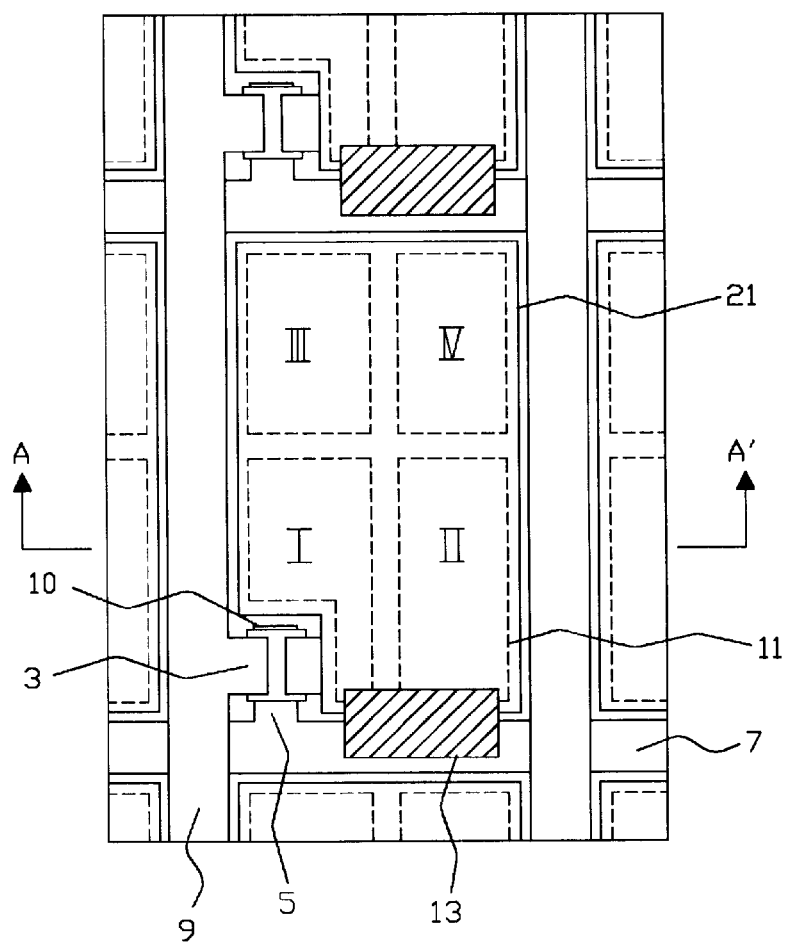
FIG. 1A is a plan view of a conventional liquid crystal display device.
Figure 1B:
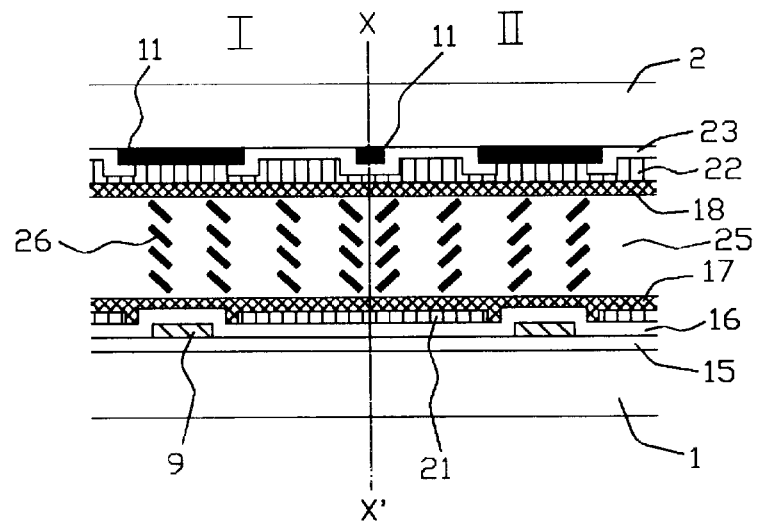
FIG. 1B is a sectional view taken on line A-A' of FIG. 1A.
Figure 2A:
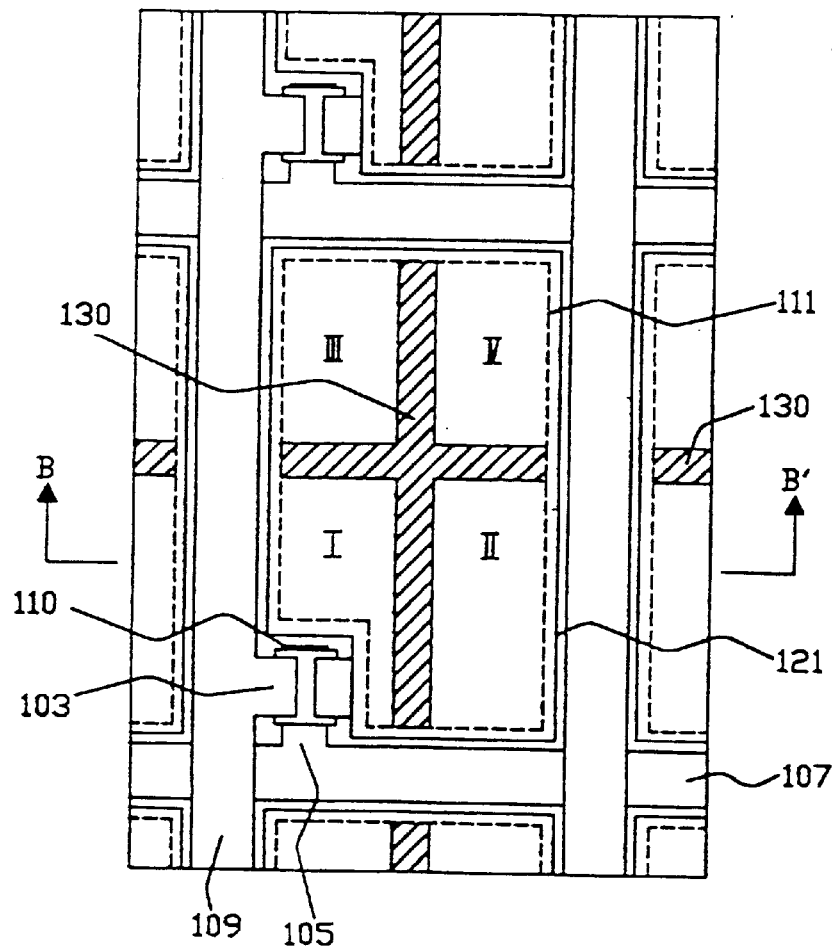
FIG. 2A is a plan view of a liquid crystal display device according to a first embodiment of the present invention.
Figure 2B:
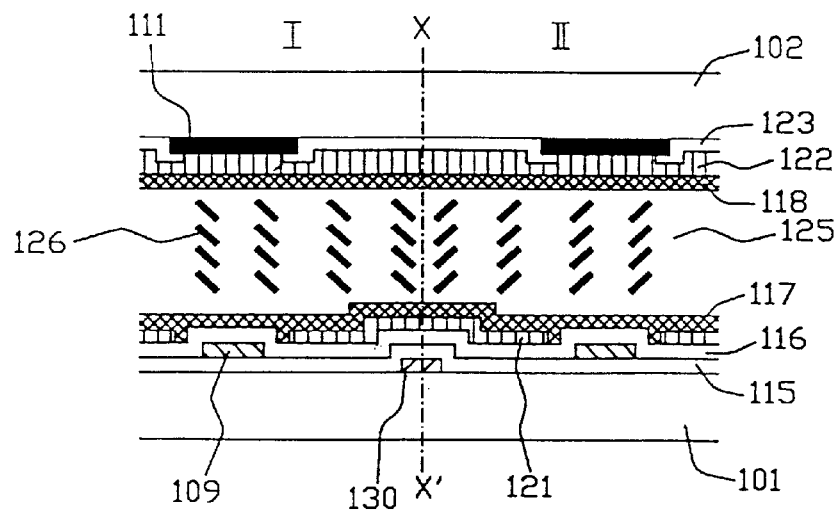
FIG. 2B is a sectional view taken on line B-B' of FIG. 2A representing one aspect of the first embodiment of the present invention.
Figure 2C:
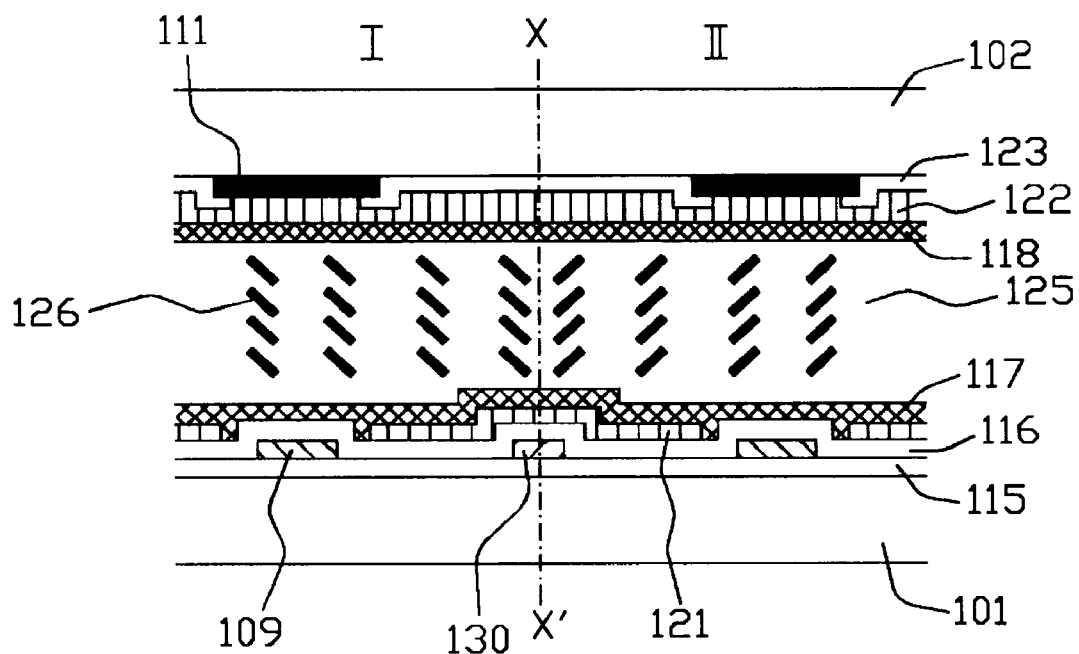
FIG. 2C is a sectional view taken on line B—B of FIG. 2A representing another aspect of the first embodiment of the present invention.

FIG. 2A represents a plan view of a liquid crystal display device according to a first embodiment of the present invention. Referring to FIG. 2A, a gate bus line 107 and a metal layer 130 are formed on a first substrate 101. FIG. 2B shows a cross-sectional view of FIG. 2A representing one aspect of the first embodiment and FIG. 2C another aspect of the first embodiment. FIG. 2B and FIG. 2C are substantially identical to one another except that in FIG. 2B, the metal layer 130 is formed on the first substrate 101 while in FIG. 2C, the metal layer 130 on a gate insulating lay 115 which is formed on the first substrate 101.

Referring to FIGS. 2A–2C, the metal layer 130 functions, as an electrode for the storage capacitor and also as a shielding layer like a black matrix layer. The metal layer 130 is formed by etching a metal film, such as Ta, Al, and Al alloy film, deposited by sputtering. The metal layer 130 is preferably formed simultaneously with the gate bus line 107. The gate insulating layer 115, such as SiOx and SiNX, is deposited by plasma chemical vapor deposition. It is also possible to anodize the gate bus line 107 for high insulation. On the gate insulating layer 115, a metal, such as Ti, Cr, Al, and/or Al/alloy, is deposited by sputtering and then etched to form a data bus line 109. A gate electrode 105 and a source/drain electrodes 103 of the thin film transistor at the cross of the gate bus line 107 and the data bus line 109 are simultaneously formed with the gate bus line 107 and the data bus line 109, respectively.

Between the gate electrode 105 and the source/drain electrodes 103, an amorphous silicon(a-Si) film is deposited and etched to form a semiconductor layer 110 as an active layer. An n+a-Si layer (not shown in figure) is deposited on the semiconductor layer 110 to form an ohmic contact layer. In the pixel region for each pixel 121, a pixel electrode 121 is formed by etching a transparent metal layer such as an indium tin oxide (ITO) layer, and a first alignment layer 117 is coated thereon. The first alignment layer 117 in each pixel region is divided into a plurality of domains and a different alignment direction is formed for each domain using a mask.

There are two methods of determining the alignment direction of the alignment layer. The first method is the rubbing method. In this method, the organic alignment layer 117 such as a polyimide layer is mechanically rubbed with a rubbing cloth to generate microgrooves, minimizing the elastic deformation energy of liquid crystal by forming a director n to align the liquid crystal parallel to the microgrooves on the surface. In the rubbing method, however, the defect of the microgrooves causes random phase distortion and light scattering, so that the image quality is deteriorated. Further, the rubbing process, i.e., brushing process, generates dust and discharge on the alignment layer causing damage to the substrate and alignment layer, deteriorating yields. In the above multi-domains, in addition, the rubbing process must be repeated several times, increasing the likelihood of further damaging the substrate.

The second method is the photo-aligning method. In this method, photo-sensitive materials such as polysiloxane based materials and polyvinylcinnamate (PVCN) based materials are used as the alignment layer. This photo-alignment layer is exposed to light such as ultraviolet light. By such exposure, side chains of the polymer of the alignment layer are directed in certain direction and the liquid crystal molecules interact with the side chains, so that the liquid crystal directors are aligned.

This photo-aligning method is very useful in a high yield process, because dust and discharge are not generated. In particular, the dead region where the alignment direction is not formed because of the step of the metal layer 130 is not generated in the photo-aligning method, so that the picture image quality is even more improved.

Referring to FIG. 2B–2C, on a second substrate 102, a shielding layer 111 and a color filter layer 123 are formed. The shielding layer 111, such as black matrix, prevents the leakage of light through the regions of the gate bus line 107, the data bus line 109, and the thin film transistor. To form the shielding layer 111, an opaque metal including Cr and CrOx is deposited by sputtering and then etched for each pixel, color filter elements R,G,B are repeated. An overcoat layer (not shown) can be formed for flatness on the color filter layer 123. A counter electrode 122 and a second alignment 118 are formed on the color filter layer 123. The counter electrode 122 is a transparent ITO electrode and the second alignment layer 118 is a polyimide layer or photo-sensitive layer.

A plurality of spacers (not shown) are provided scattered between the first substrates 101 and second substrate 102 to maintain a uniform gap between the substrates, and then liquid crystal 126 is injected between the substrates 101 and 102 in vacuum to form a liquid crystal layer 125. Then the substrates 101 and 102 are sealed, and the liquid crystal display device is formed.

In the above liquid crystal display device, referring to FIG. 2A, each pixel is divided into 4-domains. Each domain may have a different alignment direction from the other. In the boundary regions between the neighboring domains, an opaque metal layer 100 prevents the transmission of light through these boundary regions. As a result, disclination does not occur in the boundary regions. The metal layer 130 (shown in FIGS. 2B and 2C) functions as the opaque metal layer 100 (shown in FIG. 2A). Further, since the metal layer 130 also functions as an electrode for the storage capacitor, the aperture ratio is improved.

Though only 4-domain liquid crystal display devices have been described above, the present invention is not limited to 4-domains. Any liquid crystal display device having a plurality of domains can be adapted to the principle of the present invention.

Figure 3A:
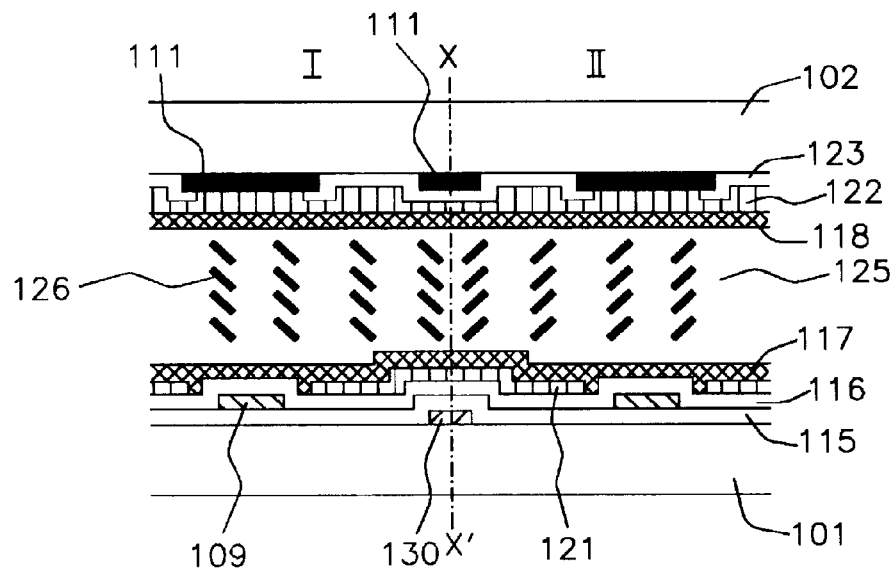
FIG. 3A is a sectional view of a liquid crystal device representing one aspect of a second embodiment of the present invention.
Figure 3B:
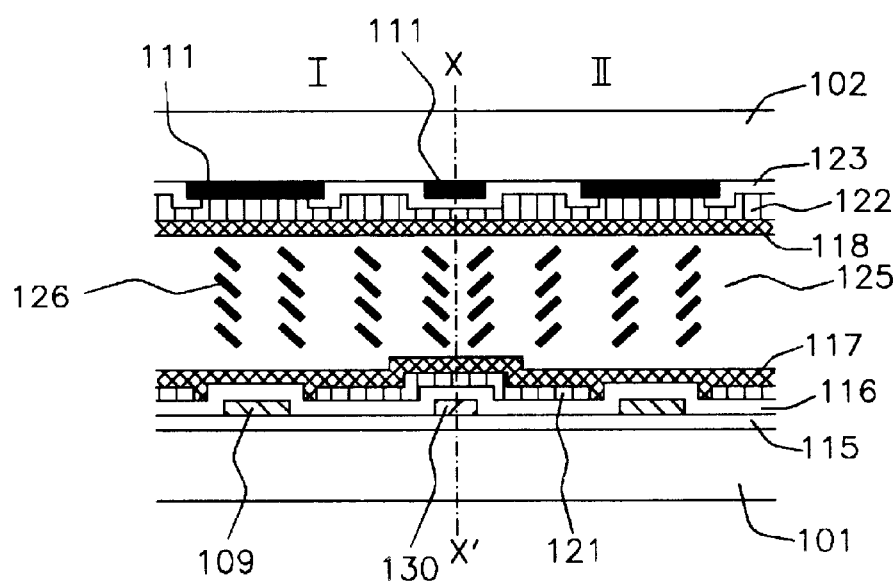
FIG. 3B is a section view of a liquid crystal device representing another aspect of the second embodiment of the present invention.

FIGS. 3A and 3B show a cross-sectional view of a liquid crystal display according to first and second aspects of a second embodiment of the present invention, respectively. FIGS. 3A and 3B are substantially similar to FIGS. 2B and 2C, respectively, except that the shield layer (black matrix) 111 in FIGS. 3A and 3B covers the boundary regions between the domains of each pixel. The same reference numbers in FIGS. 3A and 3B refer to functionally the substantially same parts in FIGS. 2B and 2C, respectively. Therefore, the description of these parts in FIGS. 3A and 3B, other than those described above, is not repeated here.

In the present invention, since the opaque metal layer is formed in the boundary regions between the domains of each pixel, disclination caused by the transmission of light through these boundary regions does not occur. Further, since the same opaque metal layer functions as an electrode for the storage capacitor, the aperture ratio is improved.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display device having a plurality of pixels, each pixel having a plurality of domains, each domain having an alignment direction different from that of at least one neighboring domain, the device comprising:

a first and a second substrate;

a plurality of gate bus lines and a plurality of data bus lines crossing said gate bus lines on said first substrate;

a plurality of switching elements at the cross of said gate bus lines and said data bus lines over said first substrate, said switching elements including a gate insulation layer on said first substrate;

a light shielding layer between said each domain and said at least one neighboring domain, said light shielding layer being over said gate insulation layer; and a liquid crystal layer between said first and second substrates.

2. The device of claim 1, further comprising:

a first alignment layer over said first substrate; and a second alignment layer over said second substrate.

3. The device of claim 2, wherein the gate bus lines and opaque metal layer includes a same metal.

4. The device of claim 2, further comprising a color filter over said second substrate.

5. The device of claim 2, wherein said first or second alignment layer includes polyimide.

6. The device of claim 2, wherein said first or second alignment layer includes photo-sensitive materials.

7. The device of claim 6, wherein said photo-sensitive materials include a material selected from a group including polyvinylcinnamate based materials and polysiloxane based materials.

8. The device of claim 1, further comprising a black matrix layer between said each domain and said at least one neighboring domain of said each pixel.

9. The device of claim 8, wherein said light shielding layer is over said first substrate; and wherein said black matrix layer is over said second substrate and is spaced a distance from said light shielding layer.

10. The device of claim 1, wherein said light shielding layer is on first substrate.

11. A liquid crystal display device, comprising:

a first and a second substrate spaced a distance from and facing one another;

a plurality of gate bus lines and a plurality of data bus lines crossing said gate bus lines defining a plurality of pixel regions, each pixel region representing a pixel and having a first electrode associated therewith on said first substrate;

a plurality of switching elements at the cross of said gate bus lines and said data bus lines;

a first alignment layer having a plurality of domains corresponding to said each pixel region over said first substrate, each domain having an alignment direction different from that of at least one neighboring domain;

a storage capacitor between said domains of said first alignment layer for stabilizing electrical potential of said first electrode;

a light shielding layer facing said storage capacitor over said second substrate; and a liquid crystal layer between said first and second substrates, said gate bus lines and said data bus lines being between said first alignment layer and said first substrate.

12. The device of claim 11, wherein said light shielding layer includes a black matrix.

13. The device of claim 11, further comprising a color filter layer over said second substrate.

14. The device of claim 11, further comprising a second electrode over said second substrate.

15. The device of claim 14, wherein said second electrode includes a transparent counter electrode.

16. The device of claim 11, further comprising a second alignment layer having an alignment direction facing, said first alignment layer over said second substrate.

17. The device of claim 16, wherein said alignment direction of said second alignment layer is different from said alignment direction of at least one of said domains of said first alignment layer.

18. The device of claim 11, wherein said gate bus lines and said storage capacitor includes a same metal.

19. The device of claim 11, wherein said first alignment layer includes polyimide.

20. The device of claim 11, wherein said first alignment layer includes photo-sensitive materials.

21. The device of claim 20, wherein said photo-sensitive materials include a material selected from a group including Polyvinylcinnamate based materials and polysiloxane based materials.

22. The device of claim 11, wherein said first electrode includes a transparent pixel electrode.

23. A method of making a liquid crystal display device having a plurality of gate bus lines, a plurality of data bus lines crossing said gate bus lines, a plurality of switching elements at the cross of said gate bus lines and said data bus lines, said switching elements including a gate insulation layer, and a plurality of pixels, comprising:

forming a plurality of domains for said each pixel, each domain having an alignment direction different from that of at least one neighboring domain; and forming a light shielding layer between said each domain and said at least one neighboring domain, said light shielding layer being over said gate insulation layer.

24. The method of claim 23, further comprising forming a black matrix layer between said each domain and said at least one neighboring domain.

25. The method of claim 23, further comprising:

forming a first alignment layer over a first substrate; and forming a second alignment layer over a second substrate opposite said first substrate.

26. The method of claim 25, wherein said light shielding layer and said gate bus lines are formed at the same time.

27. The method of claim 25, wherein said forming a first alignment layer includes exposing said first alignment layer to a light beam to obtain an alignment direction.

28. The method of claim 25, wherein said forming a second alignment layer includes exposing said second alignment layer to a light beam to obtain an alignment direction.

29. The method of claim 25, wherein said forming a first alignment layer includes rubbing a surface of said first alignment layer to obtain an alignment direction.

30. The method of claim 25, wherein said forming a second alignment layer includes rubbing a surface of said second alignment layer to obtain an alignment direction thereof.

31. A liquid crystal display device having a plurality of pixels, each pixel having a plurality of domains, each domain having an alignment direction different from that of at least one neighboring domain, the device comprising:

a first and a second substrate;

a plurality of gate bus lines and a plurality of data bus lines crossing said gate bus lines on said first substrate;

a plurality of switching elements at the cross of said gate bus lines and said data bus lines over said first substrate, said switching elements including a gate insulation layer on said first substrate;

a light shielding layer between said each domain and said at least one neighboring domain, said light shielding layer being over said gate insulation layer;

a first alignment layer over said first substrate;

a second alignment layer over said second substrate; and a liquid crystal layer between said first and second substrates.

32. A liquid crystal display device having a plurality of pixels, each pixel having a plurality of domains, each domain having an alignment direction different from that of at least one neighboring domain, the device comprising:

a first and a second substrate;

a plurality of gate bus lines and a plurality of data bus lines crossing said gate bus lines on said first substrate;

a plurality of switching elements at the cross of said gate bus lines and said data bus lines over said first substrate, said switching elements including a gate insulation layer on said first substrate;

a light shielding layer between said each domain and said at least one neighboring domain, said light shielding layer being over said gate insulation layer;

a first photo-alignment layer over said first substrate;

a second photo-alignment layer over said second substrate; and a liquid crystal layer between said first and second substrates.

* * * * *

UNITED STATES PATENT AND TRADEMARK OFFICE
CERTIFICATE OF CORRECTION

PATENT NO.    : 6,067,140
DATED         : May 23, 2000
INVENTOR(S)   : Joung Won Woo et al.

It is certified that error appears in the above-identified patent and that said Letters Patent is hereby corrected as shown below:

<u>Column 6, claim 16,</u>
Line 8, after "facing" delete ",".

<u>Column 6, claim 21,</u>
Line 22, "Polyvinylcinnamate" should read -- polyvinylcinnamate --.

Signed and Sealed this

Second Day of April, 2002

*Attest:*

*Attesting Officer*

JAMES E. ROGAN
*Director of the United States Patent and Trademark Office*